United States Patent
Linn

[11] 3,987,755
[45] Oct. 26, 1976

[54] IMPREGNATOR UNIT FOR CATALYST MANUFACTURE

[75] Inventor: Michael S. Linn, Arlington Heights, Ill.

[73] Assignee: Universal Oil Products Company, Des Plaines, Ill.

[22] Filed: Feb. 18, 1975

[21] Appl. No.: 550,899

[52] U.S. Cl. .............................................. 118/417
[51] Int. Cl.² ........................................... B05C 3/05
[58] Field of Search ............ 118/417, 19, 423, 426, 118/429; 427/242; 134/65

[56] References Cited
UNITED STATES PATENTS

| 787,108 | 4/1905 | Oliver | 134/65 X |
| 799,824 | 9/1905 | Baenen | 134/65 |
| 941,821 | 11/1909 | Sorenson | 118/417 X |
| 2,295,918 | 9/1942 | Thomas | 134/65 X |
| 2,313,820 | 3/1943 | Hall | 118/417 X |
| 3,297,043 | 1/1967 | Adams | 134/65 X |
| 3,382,046 | 5/1968 | Faugeras | 134/65 X |
| 3,595,680 | 7/1971 | Fischer et al. | 118/19 X |

Primary Examiner—Morris Kaplan
Attorney, Agent, or Firm—James R. Hoatson, Jr.; Philip T. Liggett; William H. Page, II

[57] ABSTRACT

An elongated impregnator chamber is provided with superposed trough and rotating auger means which are positioned to be below the surface of an activating solution that will be introduced into and retained in the chamber during impregnating operations. The counter-rotation of the auger means in the successive superposed troughs will provide for a relatively rapid continuous movement of particles through the impregnator chamber and, in turn, provide improved efficiency in comparison to batch impregnations. Chamber discharge is through a conduit communicating with the lowermost trough and extending upwardly above the solution level in the chamber.

1 Claim, 2 Drawing Figures

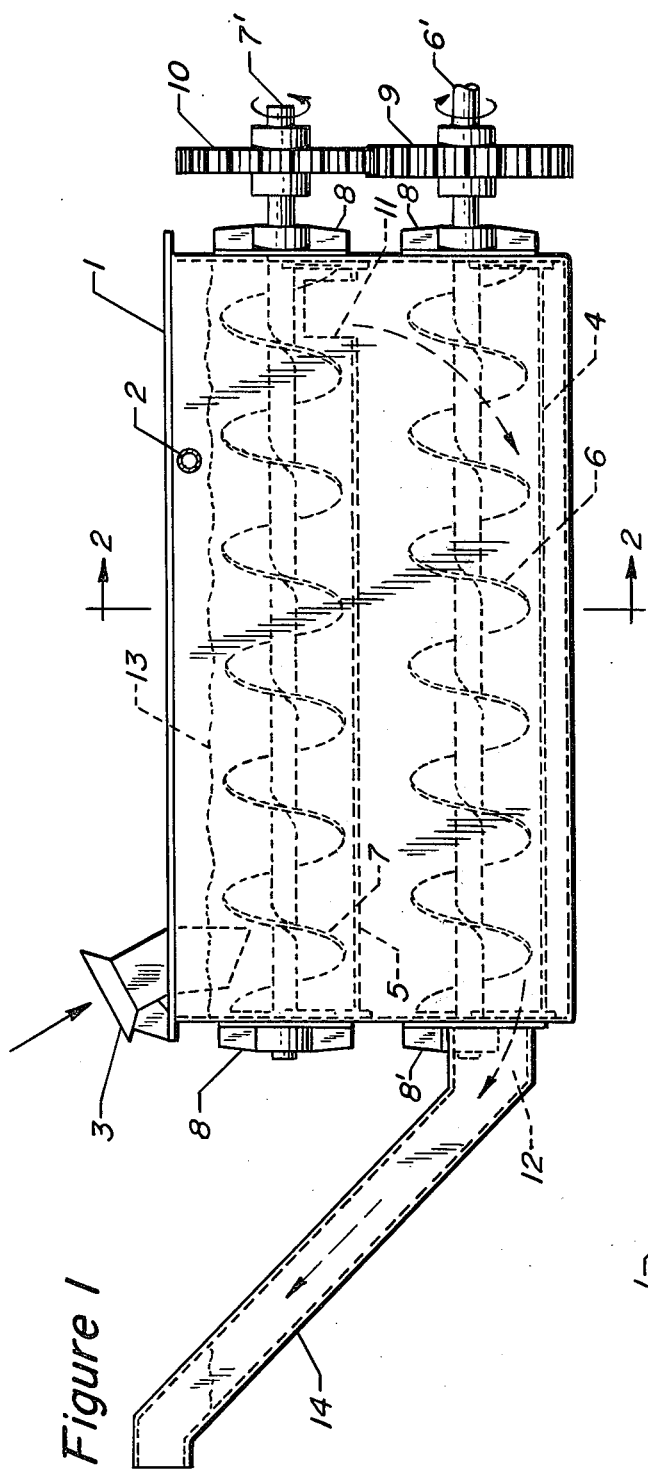
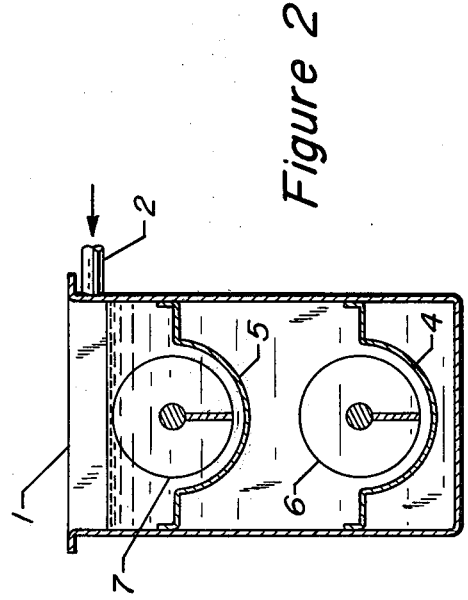
Figure 1
Figure 2

IMPREGNATOR UNIT FOR CATALYST MANUFACTURE

The present invention relates to an improved form of catalyst impregnation unit which will provide for a continuous means of effecting the catalytic activation of subdivided forms of catalyst base material.

More particularly, the present invention is directed to a particle impregnating apparatus which utilizes power-operated auger means to carry the solid particles through the unit such that they are retained immersed under a catalytic activating solution.

In connection with the preparation of catalyst particles such as may be used in catalytic processes for the petroleum industry or as catalysts in the conversion of noxious gases, such as in catalytic converters for automobile exhaust fumes, etc., there is a need to have improved continuous impregnation precedures in order to provide for the rapid, high volume production of catalyst particles. There is also the need to obtain means to obtain good contact between catalyst support spheres, or other type particles, and the activating solution so as to insure uniformity in the activation of all of the resulting catalyst particles.

It is, of course, known that various techniques may be used to impregnate a carrier material; i.e., the catalytic components from an impregnating solution can be adsorbed on the support material by soaking, dipping, suspending, or otherwise immersing the material in the solution. The efficiency of the contact can vary with the actual procedure being followed or with the type of equipment being used in the impregnation operation. There are thus many factors which can result in poor quality catalysts. For example, in a quite customary or conventional impregnation system, the support particles, after suitable preparation to serve as a high surface area carrier material, are placed in screen basket means to be dipped or dragged through the impregnating solution. Such dipping operations can be accomplished mechanically; however, where there is a relatively large batch of support material in the basket means, there may be a poor contact of the inner portion of the batch of particles with the solution and resulting lack of good uniformity and high activity for all of the particles.

It is thus an object of the present invention to provide an improved mechanical movement of catalyst support particles through an activating solution such that there is a stirring of the particles while in contact with the solution to obtain improved exposure of the support material to the solution.

It is also a specific object of the present invention to utilize rotating auger means to effect a dual function in an impregnating apparatus by providing a means which will mechanically move the support particles through a catalytic activating solution, while at the same time causing a stirring of particles and of the solution such that good contact will result for all of the particles passing through the bath.

It may also be considered an object of the present invention to provide an impregnator unit which minimizes the need of a large quantity of solution in the unit to effect the immersion and efficient contact of the solid support particles.

In a broad embodiment, the invention provides an impregnator unit for effecting the continuous movement of subdivided solid particles through an activating solution, which comprises in combination, an elongated solution holding chamber, a lower trough means and at least one upper trough means each of which extend longitudinally through said chamber, with one trough being superposed above the other and passage means to transfer particles from one trough to a next lower trough, a rotatable auger means positioned above each trough means to provide for the longitudinal movement of particles along each trough, power means for rotating said augers and providing that particles will be passed in different directions with respect to next adjacent auger means, means to charge particles to said chamber above the uppermost auger and trough means and means to withdraw contacted particles from the lower portion of the chamber, and means to introduce an activating solution to the interior of said chamber to immerse said trough and auger means.

Preferably, the size of the solution holding chamber will not be substantially larger than the length and width of the trough and auger means such that a minimum quantity of impregnating solution will be retained within the unit. The retention of a relatively small volume of liquid also provides that the rotation of the auger means and the movement of the subdivided particles through the unit will, at the same time, agitate and stir the activating solution within the chamber to insure its uniformity and homogeneity for contact with the support material being catalytically coated.

The use of auger means to move the particles through the impregnator unit is of advantage in two aspects, as briefly noted hereinbefore, in that the auger means will continuously rotate and stir the subdivided particles to insure their uniform impregnation by the activating solution and at the same time there is the continuous controlled movement of the particles through the impregnator unit at a uniform rate.

The size of any particular impregnating unit will, of course, depend upon the quantity of material to be handled over a given period of time, and relatively small units with 2 to 3 inch diameter augers might well be utilized in small sized chambers which will merely hold a relatively few gallons of activating solution. On the other hand, large diameter augers, one foot in diameter or larger and several feet in length, might well be utilized in relatively large chambers such that large quantities of catalyst support material can be handled in the impregnating unit so as to have a high throughput for the impregnating system. There is an advantage in having a chamber that is not greatly larger than the length and width of the trough means such that only minimal inventories of activating solution are required within the chamber of the unit. This, in turn, permits easy and rapid changes of impregnating solutions in the event that the same equipment is to be utilized for different impregnating operations. It is, of course, not intended to limit the present invention to any one type of operation or to the preparation of any one type of catalyst. A unit of this type may well be utilized for impregnating small spherical particles, or it may handle various shapes of extrudates which are cylindrical or non-spherical. In other words, the unit can handle various support particles as long as the material is in a generally subdivided form capable of being efficiently moved along by auger means from one portion of the chamber to the other. As a result, the catalyst to be prepared may be of a type suitable for various of the chemical or hydrocarbon conversion operations, such as for isomerization, dehydrogenation, dehydrocyclization, hydrocracking, etc. Also, the present form of impregnating apparatus may well be used for particulate catalyst that will be utilized in automobile exhaust converters, as for example, the platinum group metal impregnated spherical form catalyst.

Typically, catalyst support materials are high surface area, porous supports which can be impregnated and will absorb various activating compounds. The preferred carrier materials are the refractory inorganic oxides including alumina, silica, zirconia, thoria, boria, etc., and combinations thereof, such as alumina-silica, alumina-zirconia, and the like. Suitable aluminas include gamma-alumina, eta-alumina and theta-alumina, of which the first mentioned gamma-alumina is preferred. Actually, alumina may be naturally occurring alumina or it may be synthetically prepared in any conventional or otherwise convenient manner. Support materials may also be made in various shapes depending upon the intent of use for the catalyst product. In other words, they may be spheres, pills, granules, extrudates, powders, etc. Generally, the sphere is the preferred form in that it can be poured and handled in an easier manner than various to the forms which tend to pack or agglomerate. In one method of preparation, alumina spheres can be prepared substantially in accordance with the oil-drop method described in U.S. Pat. No. 2,620,314, which is directed to the dispersing of droplets of an alumina sol into a hot oil bath, with the aluminum chloride sol having been prepared by digesting alumina pellets in hydrochloric acid and/or an aqueous chloride solution. Spheres can also be made by effecting the high speed rotation, i.e. spinning, of small discrete particles of moist extrudate such that there is the formation of generally spherical particles. The size of the particles will, of course, depend upon the size and moisture content of the extrudate and the spinning rate, etc. Typically, catalyst particles are in the size range of from about 1/16 to about ½ inch; however, larger and smaller sizes might well be utilized in a particular processing operation.

The nature of the impregnating solution to be utilized in the present form of impregnator unit will, of course, depend upon the type of resulting catalyst which is desired from the particular impregnation step. Catalysts which are to be utilized in dehydrogenation type conversions, or which will be utilized in oxidaton reactions such as for automobile exhaust gas converters, may well utilize platinum group metals including platinum, palladium, ruthenium, rhodium, iridium, and osmium, or combinations thereof. Thus, suitble platinum group metal compounds for use in an impregnating solution might well include platinum chloride, chloroplatinic acid, ammonium chloroplatinate, dinitrodiaminoplatinum, palladium chloride, chloropalladic acid, and the like. In other instances where a non-noble metal catalyst is to be prepared, there may be the utilization of an impregnating solution which will contain an iron group metal component such as iron, cobalt, nickel, or in other instances, there may be chromium, molybdenum, etc., with such metals being used alone or in combination with another metal.

Impregnating conditions may vary; however, typically, many impregnations are carried out at ambient temperature for relatively short periods of operation of the order of 30 minutes or more. Resulting impregnated particles are typically dried and then calcined at a relatively high temperature; however, such processing steps ae not involved in the present invention. The principal feature of this invention is directed to insuring an improved impregnation apparatus which will provide an efficient stirred type of contact between the catalyst support material and the impregnating solution.

Reference to the accompanying drawing and the following description thereof will serve to illustrate diagrammatically one form of impregnating apparatus in accordance with the present invention and in addition will serve to set out additional advantageous features obtained from the use of the rotatable auger means in the unit.

FIG. 1 of the drawing is a diagrammatic elevational view of an impregnator utilizing superposed auger means to effect the movement of catalyst support materials through the unit.

FIG. 2 of the drawing is a cross-sectional view through the impregnating apparatus, as indicated by the line 2—2 of FIG. 1 of the drawing.

Referring now particularly to both FIGS. 1 and 2, there is indicated the use of a relatively long, narrow and open-topped liquid retaining chamber or housing 1, which has a liquid inlet means at 2 and particle introducing means at 3. Internally within the chamber 1, there is a lower trough means 4 and an upper trough means 5, with the latter superposed longitudinally above the lower trough means 4. Also, partially within and above each of the respective trough means 4 and 5 there are provided rotatable auger means 6 and 7. Each of the auger means are provided with suitable end bearing support means such as at 8 and 8' which are indicated externally at each end of the elongated chamber 1. Additionally, there is indicated the utilization of gear means 9 and 10 on extended shaft portions 6' and 7' for each of the respective auger means 6 and 7.

Various power supply means may be utilized to effect the rotation of the auger means within the impregnating chamber; however, typically motor-operated power means will be connected to one of the shafts, such as 6', whereby gear 9 intermeshing with gear 10 will provide for the rotation of each of the auger means 6 and 7. Also, the intermeshing gear means will provide for the opposite rotation for each of the auger means to, in turn, provide for the movement of subdivided particles through the troughs in opposing directions such that the particulates passing downwardly through the unit will be caused to pass in a serpentine manner by moving longitudinally in one direction in the upper trough and then reversing direction to move the opposite way in the next lower trough.

As heretofore noted, the use of auger means in moving subdivided catalyst support particles will insure that the particles are moved at a uniform rate of speed for a controlled time period through the two or more stages of augers and trough means to insure a stirred, uniform exposure of particulates to the impregnating solution. In the present embodiment, the particulates will be continuously supplied through the charge line, or inlet means at 3, to one end of the uppermost auger and tray means such that particles will move in one direction through trough means 5 to an outlet therein, indicated as passageway opening 11, where they will descend to the end of auger means 6 which is opposite the inlet end 3 and then move in a reverse direction, by virtue of the rotation of auger means 6, such that the particles will leave the other end of the impregnating unit and trough 5 to be discharged through an end outlet means 12.

The present embodiment illustrates the use of two superposed auger means and accompanying trough means; however, additional superposed auger means, or side-by-side auger means, might well be utilized within the same chamber retaining the activated solution such that there are additional passes for the same particulates, or such that an additional row of augers might well handle an additional charge of subdivided particles, whereby the same liquid solution can be utilized for impregnating a larger quantity of support materials at the same time. A preferred device will utilize at least two superposed auger means such that there is a reversal in flow direction for the movement of the support material through the chamber to insure a uniform impregnation and an accompanying agitation of the impregnating solution through the use of the counter-rotating auger means within any one chamber.

With respect to the removal of the impregnated particles at outlet means 12, there may be utilized an inclined discharge conduit 14 which will carry up to a level slightly above the solution level 13 in chamber 1 such that the particles can be discharged from the unit without loosing the solution from the chamber 1. In the event that there is a problem with the upward movement of contacted particles through the inclined conduit means 14, there may be the use of auxiliary auger means therein to provide a positive lifting and moving of particles to an outlet end of the conduit. Alternatively, there may be utilized a bucket elevator lift means within an open-topped enclosure that is connective with the outlet means 12 whereby the resulting catalytically impregnated particles can be lifted to a point above the liquid level 13 and again provide an arrangement wherreby the impregnating solution is retained within the system. Still other particle removal means may be provided as long as the system provides for a minimal loss of solution from the impregnator unit while effecting the removal of the particles. There will, of course, be some impregnating solution continuously taken up by the particles, as well as lost in the discharge of the particles from the unit and, as a result, there may be the continuous or periodic addition of solution to the unit by way of inlet means 2 or at several suitable inlet positions.

It is to be understood that the present illustrated embodiment is diagrammatic and that various construction modifications may well be made within the scope of the invention. For example, chamber 1 may be provided with a substantially closed top portion where desired to retain fumes or to preclude loss of liquid from splashing. There may be port means for analytical equipment to check the concentration of the impregnating solution, and to check temperatures, etc. Also, various types of drive means may be utilized for the augers in lieu of the gear arrangement which has been illustrated and described. Although not indicated, there also may be suitable small passageways or perforations within the trough means so as to permit liquid flow back and forth through the various portions of the longitudinal troughs and, in turn, insure adequate mixing of the impregnating solution to retain uniformity as to content throughout the entire portion of chamber 1. The use of lining materials or the use of a particular type of construction material for the interior portions of the unit may be dependent upon the type of impregnating solution which will be utilized in the particular catalyst manufacture process. For example, in the utilization of highly acidic materials, it may be desirable to have interior coatings or linings over the various metallic parts of the unit or, alternatively, there may be the use of particular types of stainless steels or other metals which will be compatible with the solution being used in the apparatus.

I claim as my invention:

1. An impregnator unit for effecting the continuous movement of subdivided solid catalyst particles through an activating solution whereby to effect uniform and efficient mixing of said particles with said solution, which comprises in combination, an elongated solution holding chamber, a lower trough means and at least one upper trough means each of which extend longitudinally through said chamber, with one trough being superimposed above the other and passage means to transfer particles from one trough to the next lower trough within said chamber, a rotatable auger means positioned within each trough means to provide for the longitudinal movement of particles along each trough, the size of said solution holding chamber being not substantially larger than the length and width of said auger and trough means positioned in said chamber, whereby the volume of activating solution to be held in said chamber will be minimized and said solution is agitated by rotation of said auger means therein, power means for rotating said augers, means to charge particles to said chamber above the uppermost auger and trough means and means to withdraw contacted particles from the lower portion of the chamber, means to introduce an activating solution to the interior of said chamber at a sufficient level to immerse said troughs and auger means therein, drive means in interconnection with each of said auger means to drive said respective auger means in opposite directions to each other to thereby reverse the direction of movement of said catalyst particles as said particles move through said unit from said upper trough means to said lower trough means, an inclined discharge conduit interconnected with said lower trough means terminating at a level above said level of said activating solution, and auxiliary power means in interconnection with said discharge conduit to provide a positive lifting and moving of said particles to the outlet end of said discharge conduit, whereby said inclined discharge conduit provides for maintaining the liquid at said sufficient level.

* * * * *